UNITED STATES PATENT OFFICE.

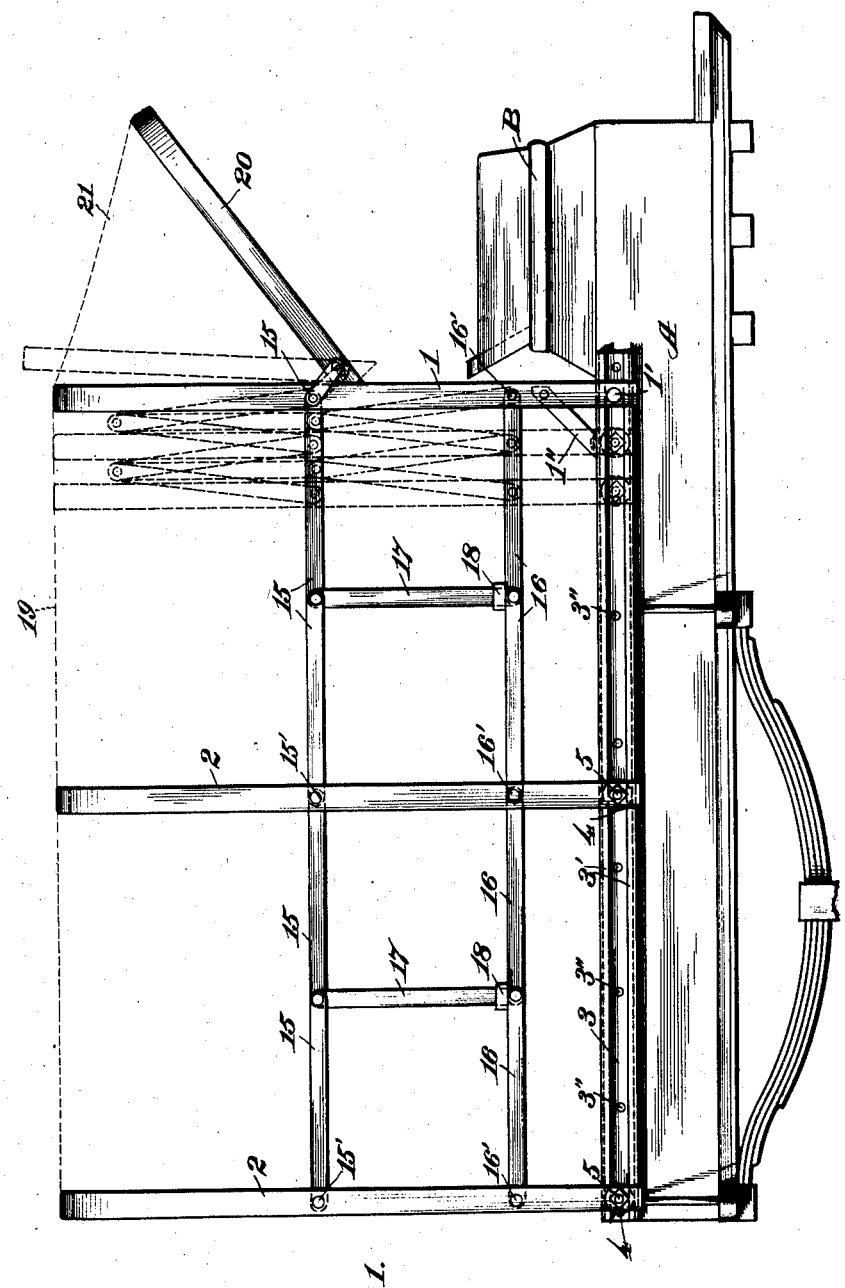

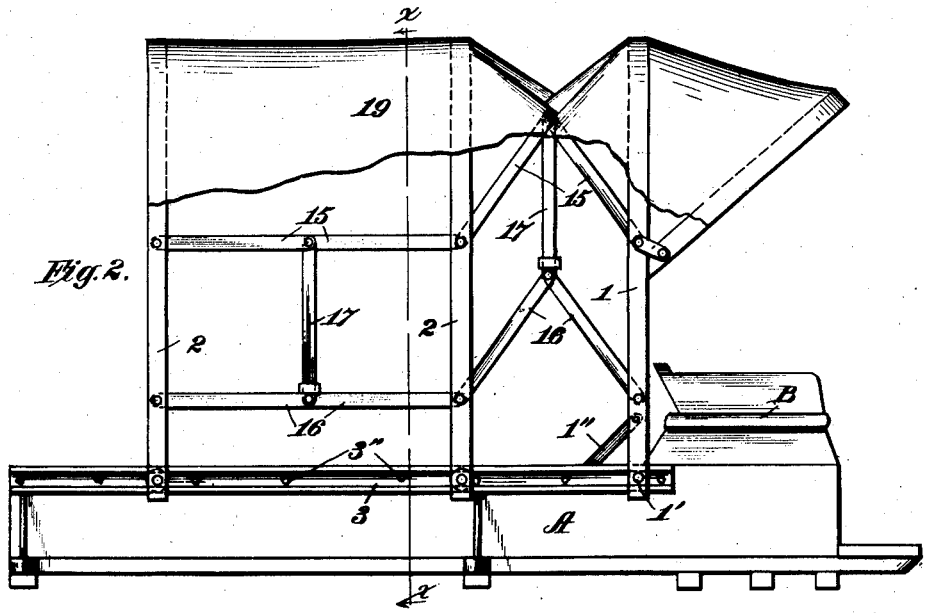
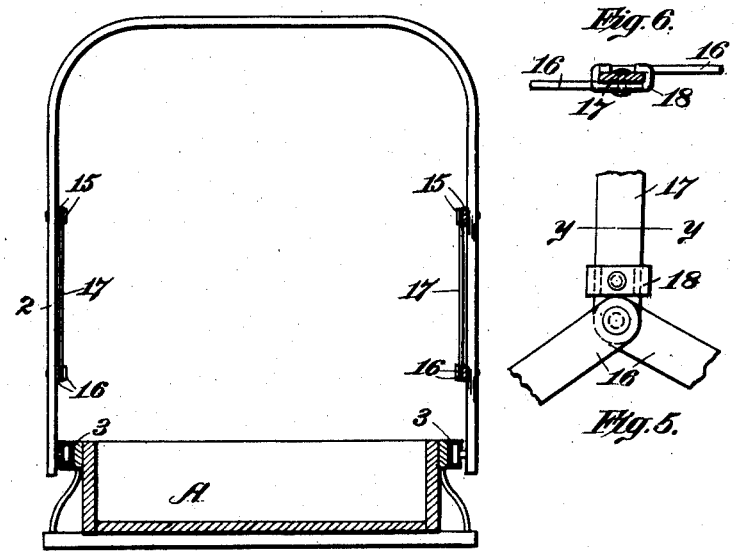

LEO DAVID PANGBORN, OF MENOMINEE, MICHIGAN, ASSIGNOR TO MARSHALL B. LLOYD, OF MENOMINEE, MICHIGAN.

FOLDING WAGON-TOP.

No. 905,571.　　　　Specification of Letters Patent.　　　　Patented Dec. 1, 1908.

Application filed May 18, 1907. Serial No. 374,384.

*To all whom it may concern:*

Be it known that I, LEO DAVID PANGBORN, a citizen of the United States, and a resident of Menominee, Menominee county, Michigan, have invented certain new and useful Improvements in Folding Wagon-Tops, of which the following is a full, clear, and exact description, such as will enable others skilled in the art to which it appertains to make and use the same.

My invention relates to vehicle tops and has special reference to folding tops or covers for wagons.

On many wagons such as light and heavy delivery wagons, tops are objectionable at most times, for the reason that they interfere with the easy loading of the wagons, but at other times they are needed to protect the loads. In many cases it is the custom to employ removable tops which are placed on the wagons when the weather is inclement or threatening, but this is objectionable, because the tops are not always in place when needed.

The object of my invention is to provide an improved top for wagons of various kinds, which tops shall be constructed in such manner as to be capable of covering part or all of the wagon body when there is need of the same, but which unlike other wagon tops, shall be collapsible and hence adapted to be kept upon the wagon in collapsed or folded condition, when not required to protect the contents of the wagon.

In brief, my purpose is to provide a readily collapsible and snugly foldable top for use upon commercial wagons and the like.

A particular object of the invention is to provide a foldable or collapsible wagon top of simple and economical construction which shall be durable; which shall present a neat and attractive appearance in both folded and opened conditions; and, which may be operated with ease from the driver's seat.

Still further objects of my invention will appear hereinafter.

With these objects in view my invention consists generally in a wagon body which is equipped with horizontal rails or guides, in combination with bows having their lower ends slidably fixed upon the wagon body by said rails, one of said bows being secured to the wagon body, parallel motion devices arranged between adjacent bows and adapting the same to be folded, and a top proper of flexible fabric, fastened upon said bows. And further and particularly my invention consists in a pair of rails or guides for attachment to the sides of a wagon body, in combination with a bow or top frame part secured to the forward ends of said rails, other bows having anti-friction members at their lower ends whereby they are slidably attached to said rails, parallel motion devices connecting said bows and adapted to hold the same distended, and a top proper of readily foldable fabric, fastened upon said bows.

My invention also consists in various novel details of construction and in combinations of parts, all as hereinafter described and particularly pointed out in the claims.

The invention will be more readily understood by reference to the accompanying drawings forming a part of this specification and in which:

Figure 1 is a side elevation of a wagon body equipped with a foldable top embodying my invention, the same, for the sake of clearness, being shown with the canvas or other fabric removed; Fig. 2 is a like side elevation on a reduced scale, showing the top partially folded; Fig. 3 is a vertical section on the line X—X of Fig. 2; Fig. 4 is an enlarged vertical, transverse, sectional detail of one of the rails or guides and the lower end or foot of a bow; Fig. 5 is an enlarged detail of the lower junction of one of the parallel motion devices; and Fig. 6 is a sectional detail on the line Y—Y of Fig. 5.

In the accompanying drawings I have illustrated only one form of my novel wagon top and it should be understood that this may be variously modified without departing from the spirit of the invention. In these drawings, A, represents a wagon body of the kind usually employed by butchers and grocers. The seat, B, is placed at the forward end, leaving the body free to receive its load of goods. At a point just back of the seat I place the first bow, 1, and fasten its lower ends, 1', to the sides of the wagon body. 2—2 represent other bows like the bow, 1, but so arranged that they may be moved toward and from the same.

For supporting the movable bows I employ two rails or guides, 3—3, whereto the lower ends of the movable bows are connected by metallic feet or anti-friction devices, hereinafter described. These rails are preferably formed from sheet metal of a proper thickness and are channel-like in cross section. They are, however, unlike the ordinary channel bar, in that they are provided with inwardly extending flanges, 3'. In other words the rails or guides are in the form of tubes which are rectangular in cross section and which contain narrow slots in their outer sides. These rails are fastened to the sides of the wagon by a number of short bolts, 3'', and extend from points back of the seat to the rear end of the wagon.

As shown in Figs. 1 and 2, I prefer to fasten the first bow to the rails, 3—3, rather than directly to the sides of the wagon body, the entire wagon top being thus made complete in itself and applicable as such to any wagon of approximately the same width. When the rails have been secured to the sides of the wagon, the bow, 1, is fixed in vertical position by means of short braces, 1'', attached either to the rails or to the wagon body. The means which I preferably employ for connecting the lower ends of the bows, 2, with the rails, consist in small anti-friction rollers, 4, which fit the channeled rails. Each roller is revoluble upon a stud, 5, extending inwardly from a bow; and it will be seen that beside preventing frictional resistance to the movement of the bows, the rollers also prevent vertical movement of the bows on the body. One advantage of this structure is that it presents a very neat and compact appearance, and allows the canvas top to be brought down to the extreme lower ends of the bows.

The parallel motion devices before alluded to are arranged between adjacent bows throughout the structure and at opposite sides of the folding top. I prefer to use bent wood bows, whereas the parallel motion devices are made of flat metal bars. Each parallel motion device comprises two toggle levers 15 and 16 joined by a vertical link, 17, which is parallel with the sides of the connected bows. The ends of the toggle levers, 15—15, 16—16, are pivoted to the inner sides of the bows by pins or rivets, 15'—16'. With such devices at each side, it is obvious that the connected bows will be held parallel with the rigidly fixed bow, 1, in either folded or extended positions. The bows are joined together in series and when the parallel motion devices are raised, the movable bows may all be folded or collapsed against the front bow, as shown by dotted lines in Fig. 1. When the parallel motion devices are opened, the bows will be held in their extended positions as shown by full lines in Fig. 1.

The stops, 18, on the vertical bars or links, 17, are formed after the manner of Figs. 5 and 6, being small clasps or open collars riveted on the links 17, in position to engage the tops of the bars, 16. These prevent downward movement of the parallel motion devices beyond straight lines. When it is desired to fold the top the driver reaches back from the seat and grasps the adjacent parallel motion devices and lifting them draws the movable bows forward. After shutting the first movable bow against the fixed bow, the driver in like manner collapses the next section of the top and thus on to the end. Any suitable means may be employed for holding the top in folded condition. The cover or top proper, 19, is made of flexible fabric, such as painted canvas and is fastened to the several bows.

20, represents a foldable front bow, to which the hood, 21, of fabric, is attached.

As various modifications of my invention will readily suggest themselves to one skilled in the art, I do not confine the invention to the specific constructions herein shown and described.

Having thus described my invention, I claim as new and desire to secure by Letters Patent:

1. A vehicle body, in combination with channel-like flanged rails fixed to the sides of the vehicle body and presenting their slotted sides outwardly, a fixed bow, movable bows having anti-friction members at their lower ends, said members being movable in respective rails, a top proper of flexible fabric and means connecting the movable bows together and to the fixed bow, for holding the movable bows upright when distended, substantially as described.

2. A folding vehicle top, comprising channel-like rails having vertically disposed flanges forming narrow slots in the sides of the rails, in combination with a bow fixed to said rails, struts or braces extending from the inner sides of said rails to said bow and securing the same in perpendicular relation other bows movably connected to said fixed bow, studs at the lower ends of the movable bows and rollers on the studs, within said rails, substantially as described.

3. A folding vehicle-top, comprising two channel-like flanged rails, substantially rectangular in cross section and having slots in their sides, to be fastened upon the sides of a vehicle body, in combination with a bow, means for securing said bow in upright position upon said rails, a plurality of movable bows, metallic feet extending inwardly from the lower ends of said movable bows, fitting said rails and movable therein, and parallel motion devices connecting said bows in series, substantially as and for the purpose specified.

4. A vehicle body in combination with channel rails having laterally opening longitudinal slots, fastened to the sides of said body, a fixed bow, movable bows provided near their lower ends with inwardly extending anti-friction members adapted for longitudinal movement within said rails, a top or cover of flexible material, and means for holding said movable bows upright and in parallel relation, comprising a plurality of toggle braces extending between said bows and having their ends pivoted thereto, and vertical strengthening links having their ends pivoted to the joints of said braces, substantially as described.

In testimony whereof, I have hereunto set my hand, this 9th day of May, 1907, in the presence of two subscribing witnesses.

LEO DAVID PANGBORN.

Witnesses:
JOHN R. LEFEVRE,
M. SIMON.